(12) United States Patent
Asano et al.

(10) Patent No.: US 6,428,658 B1
(45) Date of Patent: Aug. 6, 2002

(54) METHOD FOR MANUFACTURING MAGNETIC HEAD SUSPENSIONS AND METHOD FOR INSPECTING METAL SUBSTRATES FOR MAGNETIC HEAD SUSPENSIONS

(75) Inventors: Takeshi Asano; Atsushi Tanaka; Yasuhisa Toujou; Toshihiko Omote, all of Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/669,430

(22) Filed: Sep. 25, 2000

(30) Foreign Application Priority Data

Sep. 30, 1999 (JP) .......................................... 11-277925

(51) Int. Cl.⁷ ............................................. C23C 14/00
(52) U.S. Cl. .................................................. 204/192.13
(58) Field of Search ........................ 204/192.13, 192.2; 73/865.8; 427/2.11, 8, 128, 548; 29/603.09, 603.1, 603.13; 360/265.9

(56) References Cited

U.S. PATENT DOCUMENTS 5,282,103 A * 1/1994 Hatch et al. ................. 360/245
5,858,518 A * 1/1999 Omote et al. ................ 428/209

FOREIGN PATENT DOCUMENTS

| JP | 09 147 613 A | * 6/1996 |
| JP | 10-320736 | 12/1998 |
| JP | 11 273 289 A | * 10/1999 |

OTHER PUBLICATIONS

Translation of JP 10–320736, Dec., 1998.*

* cited by examiner

Primary Examiner—Patrick Ryan
Assistant Examiner—Gregg Cantelmo
(74) Attorney, Agent, or Firm—Akin, Gump, Strauss, Hauer & Feld, L.L.P.

(57) ABSTRACT

A plurality of test pieces are taken from a long-sized substrate made of stainless steel, where the test pieces are arranged in parallel to the width direction TD of the substrate in a region near the forward end of the substrate. A variation among the curvatures of the test pieces is then measured. A substrate where the variation in the curvature is 0.002 [1/mm] or smaller is selected as a substrate used in manufacture of magnetic head suspensions. While the selected substrate is transported in its length direction, an insulating layer and a conductor layer are stacked on the substrate to form a plurality of magnetic head suspensions.

17 Claims, 10 Drawing Sheets

METHOD FOR MANUFACTURING MAGNETIC HEAD SUSPENSIONS AND METHOD FOR INSPECTING METAL SUBSTRATES FOR MAGNETIC HEAD SUSPENSIONS

BACKGROUND OF THE INVENTION

1. Field of the Invention

The present invention relates to a method for manufacturing magnetic head suspensions used in magnetic disk devices and to a method for inspecting metal substrates used for the magnetic head suspensions.

2. Description of the Background Art

A plate-like support called magnetic head suspension is used in a magnetic disk device to position the magnetic head to a desired track on a rotating magnetic disk. The magnetic head suspension has a plurality of wiring patterns formed thereon, and it also has a magnetic head supporting portion (which is hereinafter referred to as tongue) formed near an end. In manufacture of the magnetic head suspension, an insulating layer, wiring patterns, and cover layer are formed in order on a metal substrate.

Recently, a method for mass production of the magnetic head suspensions is suggested, where the processes for formation of the insulating layer, wiring patterns, and cover layer are sequentially applied to a long-sized substrate in roll form which is continuously or intermittently transported (Japanese Patent Laying-Open No.10-320736).

FIG. 12 is a plane view showing the long-sized substrate used in the aforementioned conventional manufacturing method. As shown in FIG. 12, a plurality of rectangular regions 110, each defining a unit in exposure process, are formed in two lines along the length direction of the long-sized substrate 100. Each region 110 contains a plurality of magnetic head suspensions 101 formed in 6 columns and 16 rows.

Given processes are sequentially applied to each region 110 on the long-sized substrate 100 continuously or intermittently transported, whereby a number of magnetic head suspensions are formed at once on the long-sized substrate 100.

In order to attach a magnetic head on the tongue of the magnetic head suspension, the tongue is bent so that it forms a given angle with respect to the body of the suspension (the part of the magnetic head suspension except the tongue). In this process, the tongues of a plurality of magnetic head suspensions must be bent at a constant angle.

However, the long-sized substrate wound in a roll has a certain amount of warp. The tongues of a plurality of magnetic head suspensions formed on such a substrate therefore have warp.

In the process of bending the tongues, it is desired that the tongues of a plurality of magnetic head suspensions have a constant amount of warp so that the tongues of the magnetic head suspensions can be bent at a constant angle. Accordingly it is demanded that the variation in the warp is small among the individual regions on the long-sized substrate.

SUMMARY OF THE INVENTION

An object of the present invention is to provide a method for manufacturing magnetic head suspensions in which the variation in warp of the tongues of a plurality of magnetic head suspensions formed on a long-sized metal substrate can be reduced to increase the rate of acceptable pieces.

Another object of the present invention is to provide a method for inspecting metal substrates for magnetic head suspensions in which the variation in the warp of the tongues of a plurality of magnetic head suspensions formed on a long-sized metal substrate can be reduced to increase the rate of acceptable pieces.

The inventors of the present invention have carried out various experiments and considerations to find that there is a mutual relation between the variation in curvature of a long-sized metal substrate in its width direction and the variation in warp of the magnetic head supporting portions of a plurality of magnetic head suspensions formed on the metal substrate, and that using a long-sized metal substrate where the curvature variation in the width direction measured in its partial region is equal to or smaller than a given value reduces the variation among warps of the magnetic head supporting portions of a plurality of magnetic head suspensions formed on the metal substrate. The invention shown below has been made on the basis of the findings.

According to an aspect of the invention, a method for manufacturing magnetic head suspensions comprises the steps of: measuring a variation in curvature in a width direction of a long-sized metal substrate in its partial region; selecting a metal substrate where the variation in the curvature is not more than a given value; and forming a plurality of magnetic head suspensions by sequentially forming an insulating layer and a conductor layer on the selected metal substrate while conveying the metal substrate in its length direction.

When the variation in the curvature along the width direction of a long-sized metal substrate measured in its partial region is equal to or smaller than a given value, the variation in the warp is equal to or smaller than a certain value in areas along almost the whole length of the metal substrate. Accordingly the variation in the warp of the magnetic head supporting portions of a plurality of magnetic head suspensions can be small in almost the whole length of the metal substrate by selecting a metal substrate where the curvature variation along the width direction measured in its partial region is not more than a given value, and stacking an insulating layer and a conductor layer on the selected metal substrate to form a plurality of magnetic head suspensions. This increases the rate of acceptable pieces of the magnetic head suspensions and improves the precision in the process of bending the magnetic head supporting portions.

It is preferred that the given value is $2.0 \times 10^{-3}$ mm$^{-1}$ or less. In this case, the variation in the warp of the magnetic head supporting portions can be sufficiently reduced among the plurality of magnetic head suspensions formed on the long-sized metal substrate. Accordingly the rate of acceptable pieces of the magnetic head suspensions is further increased and the precision of the process of bending the magnetic head supporting portions is further enhanced.

It is preferred that the given value is $1.0 \times 10^{-3}$ mm$^{-1}$ or less. In this case, the variation in the warp of the magnetic head supporting portions can be sufficiently reduced among the plurality of magnetic head suspensions formed on the long-sized metal substrate. Accordingly the rate of acceptable pieces of the magnetic head suspensions is further increased and the precision of the process of bending the magnetic head supporting portions is further enhanced.

The step of forming the plurality of magnetic head suspensions may comprise a step of forming the plurality of magnetic head suspensions on the metal substrate in such a manner that the length direction of the plurality of magnetic head suspensions is parallel to the width direction of the metal substrate.

In this case, in the plurality of magnetic head suspensions formed on the metal substrate, the direction in which their magnetic head supporting portions are bent coincides with the direction of the warp of the metal substrate. Since the variation in the warp in the width direction is equal to or smaller than a certain value in almost the whole length of the metal substrate, the variation among the warps of the magnetic head supporting portions can be sufficiently reduced in the plurality of magnetic head suspensions formed on the metal substrate.

The metal substrate may be made of a stainless steel having a thickness of not less than 15 μm nor more than 50 μm. The metal substrate may be made of a stainless steel having a width of not less than 100 mm nor more than 500 mm. In these cases, by selecting a metal substrate where the curvature variation along the width direction measured in a partial region is not more than a given value, the variation in the warp of the magnetic head supporting portions of the plurality of magnetic head suspensions can be sufficiently reduced in almost the whole length of the metal substrate.

The step of measuring the variation in the curvature may comprise the steps of; extracting a plurality of stripe-like test pieces extended and arranged along the width direction of the partial region of the long-sized metal substrate, setting three or more measuring points on each of the extracted test pieces along their length direction, measuring heights of the three or more measuring points set on each test piece, obtaining a curvature of each test piece on the basis of the heights of the three or more measuring points measured for each test piece, and calculating the variation in the curvature from the curvatures of the plurality of test pieces.

The step of calculating the variation in the curvature may comprise a step of obtaining a difference between maximum and minimum values of the curvatures of the plurality of test pieces as the variation in the curvature.

The step of extracting the plurality of test pieces may comprise a step of etching the partial region of the long-sized metal substrate to remove the partial region except the plurality of test pieces.

The step of measuring the heights of the three or more measuring points may comprise a step of measuring the heights of the three or more measuring points set on each test piece by using a laser microscope.

According to another aspect of the present invention, a method for inspecting metal substrates for magnetic head suspensions comprises the steps of: measuring a variation in curvature in a width direction of a long-sized metal substrate in its partial region; and selecting a metal substrate where the variation in the curvature is not more than a given value as a metal substrate for the magnetic head suspensions.

When the variation in the curvature along the width direction of a long-sized metal substrate measured in its partial region is equal to or smaller than a given value, the variation in the warp is equal to or smaller than a certain value in areas along almost the whole length of the metal substrate. Accordingly the variation in the warp of the magnetic head supporting portions of a plurality of magnetic head suspensions formed on the metal substrate can be reduced by selecting a metal substrate where the curvature variation in the width direction measured in its partial region is not more than a given value as a metal substrate for the magnetic head suspensions. This increases the rate of acceptable pieces of the magnetic head suspensions and improves the precision in the process of bending the magnetic head supporting portions.

It is preferred that the given value is $2.0 \times 10^{-3}$ mm$^{-1}$ or less. In this case, the variation in the warp of the magnetic head supporting portions can be sufficiently reduced among the plurality of magnetic head suspensions formed on the long-sized metal substrate. Accordingly the rate of acceptable pieces of the magnetic head suspensions is further increased and the precision of the process of bending the magnetic head supporting portions is further enhanced.

It is preferred that the given value is $1.0 \times 10^{-3}$ mm$^{-1}$ or less. In this case, the variation in the warp of the magnetic head supporting portions can be sufficiently reduced among the plurality of magnetic head suspensions formed on the long-sized metal substrate. Accordingly the rate of acceptable pieces of the magnetic head suspensions is further increased and the precision of the process of bending the magnetic head supporting portions is further enhanced.

The metal substrate may be made of a stainless steel having a thickness of not less than 15 μm nor more than 50 μm. The metal substrate may be made of a stainless steel having a width of not less than 100 mm nor more than 500 mm. In these cases, by selecting a metal substrate where the curvature variation along the width direction measured in its partial region is not more than a given value, the variation in the warp of the magnetic head supporting portions of the plurality of magnetic head suspensions can be sufficiently reduced in almost the whole length of the metal substrate.

The step of measuring the variation in the curvature may comprise the steps of; extracting a plurality of stripe-like test pieces extended and arranged along the width direction of the partial region of the long-sized metal substrate, setting three or more measuring points on each of the extracted test pieces along their length direction, measuring heights of the three or more measuring points set on each test piece, obtaining a curvature of each test piece on the basis of the heights of the three or more measuring points measured for each test piece, and calculating the variation in the curvature from the curvatures of the plurality of test pieces.

The step of calculating the variation in the curvature may comprise a step of obtaining a difference between maximum and minimum values of the curvatures of the plurality of test pieces as the variation in the curvature.

The step of extracting the plurality of test pieces may comprise a step of etching the partial region of the long-sized metal substrate to remove the partial region except the plurality of test pieces.

The step of measuring the heights of the three or more measuring points may comprise a step of measuring the heights of the three or more measuring points set on each test piece by using a laser microscope.

These and other objects, features, aspects and advantages of the present invention will become more apparent from the following detailed description of the present invention when taken in conjunction with the accompanying drawings.

DESCRIPTION OF THE PREFERRED EMBODIMENTS

A method for manufacturing magnetic head suspensions according to an embodiment of the invention will now be described.

In the magnetic head suspension manufacturing method of this embodiment, first, long-sized substrates made of stainless steel are inspected by the method shown below and substrates whose curvature variations in the width direction are equal to or smaller than a given value are selected. Next a plurality of magnetic head suspensions are formed on the selected substrates by the method explained later.

Figure 1:
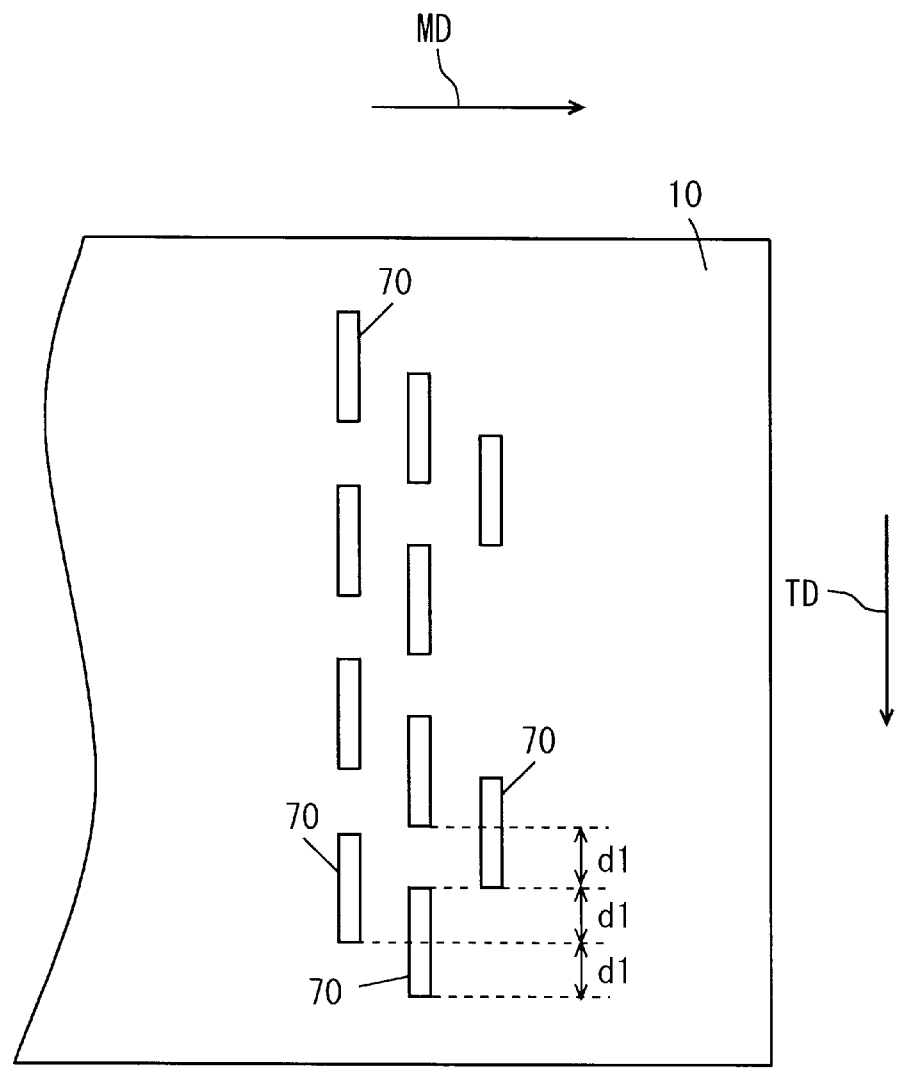
FIG. 1 is a plane view used to explain a method for inspecting a substrate used in manufacture of magnetic head suspensions according to an embodiment of the invention.
Figure 2:
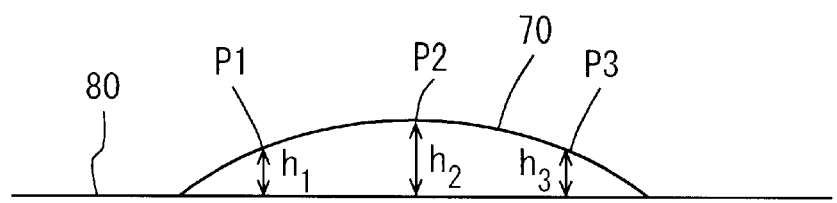
FIG. 2 is a diagram used to explain a method for measuring a variation in curvature in the width direction of the substrate shown in FIG. 1.

First, the method for inspecting magnetic head suspension substrates will be described. FIG. 1 is a plane view used to explain the method for inspecting substrates used in the manufacture of magnetic head suspensions of this embodiment. FIG. 2 is a diagram used to explain a method for measuring the variation in curvature in the width direction of the substrate of FIG. 1.

In FIG. 1, the substrate 10 has a thickness of 15 to 50 μm, a width of 100 to 500 mm, and a length of about 25 m, for example. In the area near the forward end of the substrate 10, ten test pieces 70 defined in parallel to the width direction TD of the substrate 10 are taken by etching. In this case, a pattern of etching resist is formed in the region near the forward end of the substrate 10 to cover only the areas of the test pieces 70 and the remaining part of the substrate 10 is removed by etching. The test pieces 70 each have a width of 2.5 mm in the length direction MD of the substrate 10 and a length of 30 mm in the width direction TD of the substrate 10. The ten test pieces 70 are arranged in positions shifted by a given distance d1 from each other in the entire length of the width direction TD of the substrate 10.

Next, as shown in FIG. 2, the extracted test piece 70 is set on the stage 80 of a laser microscope. Three measuring points P1, P2 and P3 are set at intervals of 10 mm in the length direction of the test piece 70 and the heights $h_1$, $h_2$ and $h_3$ of the test piece 70 are measured from the stage 80 to the measuring points P1, P2 and P3, respectively. In this measurement, the heights of the test piece 70 are measured at the three measuring points P1, P2 and P3 in the center area in the width direction of the test piece 70. Next, by using the measurements at the three measuring points P1, P2 and P3, the height h at the middle measuring point P2 is obtained by the equation below where the heights at the two measuring points P1 and P3 on both sides are taken as zero.

$$h = h_2 - (h_1 + h_3)/2 \quad (1)$$

Next, the curvature k [1/mm] of the test piece 70 is obtained by the equation below by using the height h at the middle measuring point P2 obtained by the equation (1).

$$k = 2h/(h^2 + 100) \quad (2)$$

The curvatures k of the ten test pieces 70 in the width direction TD of the substrate 10 are thus obtained through the equation (2), and then a difference between the maximum and minimum is obtained as a variation in the curvature k in the width direction TD.

On the basis of the variation in the curvature k in the width direction TD of the substrate 10, substrates 10 having variations not more than 0.002 [1/mm] are selected as acceptable pieces and substrates 10 having variations larger than 0.002 [1/mm] are rejected as defective pieces. A plurality of magnetic head suspensions are then formed on the selected substrates 10 by the method explained below.

As stated above, it is preferable to select substrates 10 where the variation in the curvature k in the width direction TD is not greater than 0.002 [1/mm] as acceptable pieces; it is more preferable, as will be explained later, to select substrates 10 where the variation in the curvature k in the width direction TD is not greater than 0.001 [1/mm] as acceptable pieces.

Figure 3:
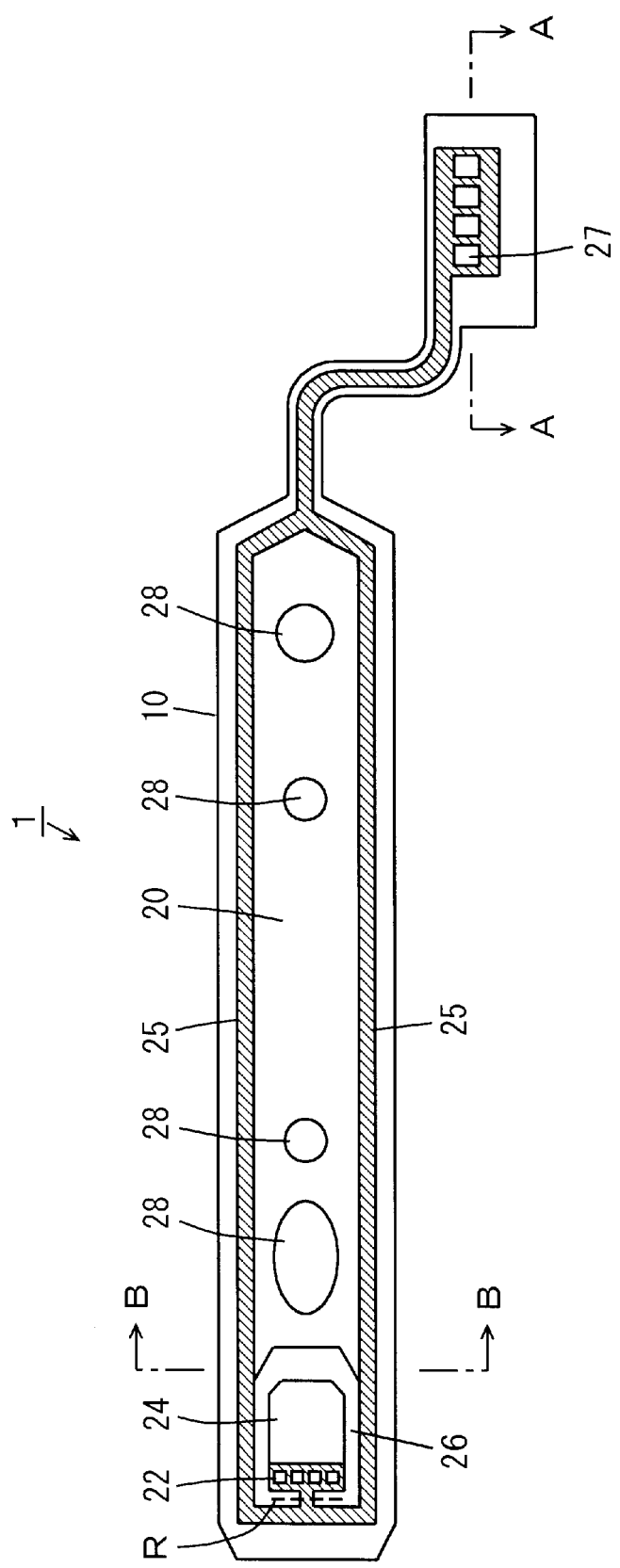
FIG. 3 is a plane view showing a magnetic head suspension manufactured by a manufacturing method of the embodiment of the invention.
Figure 4:
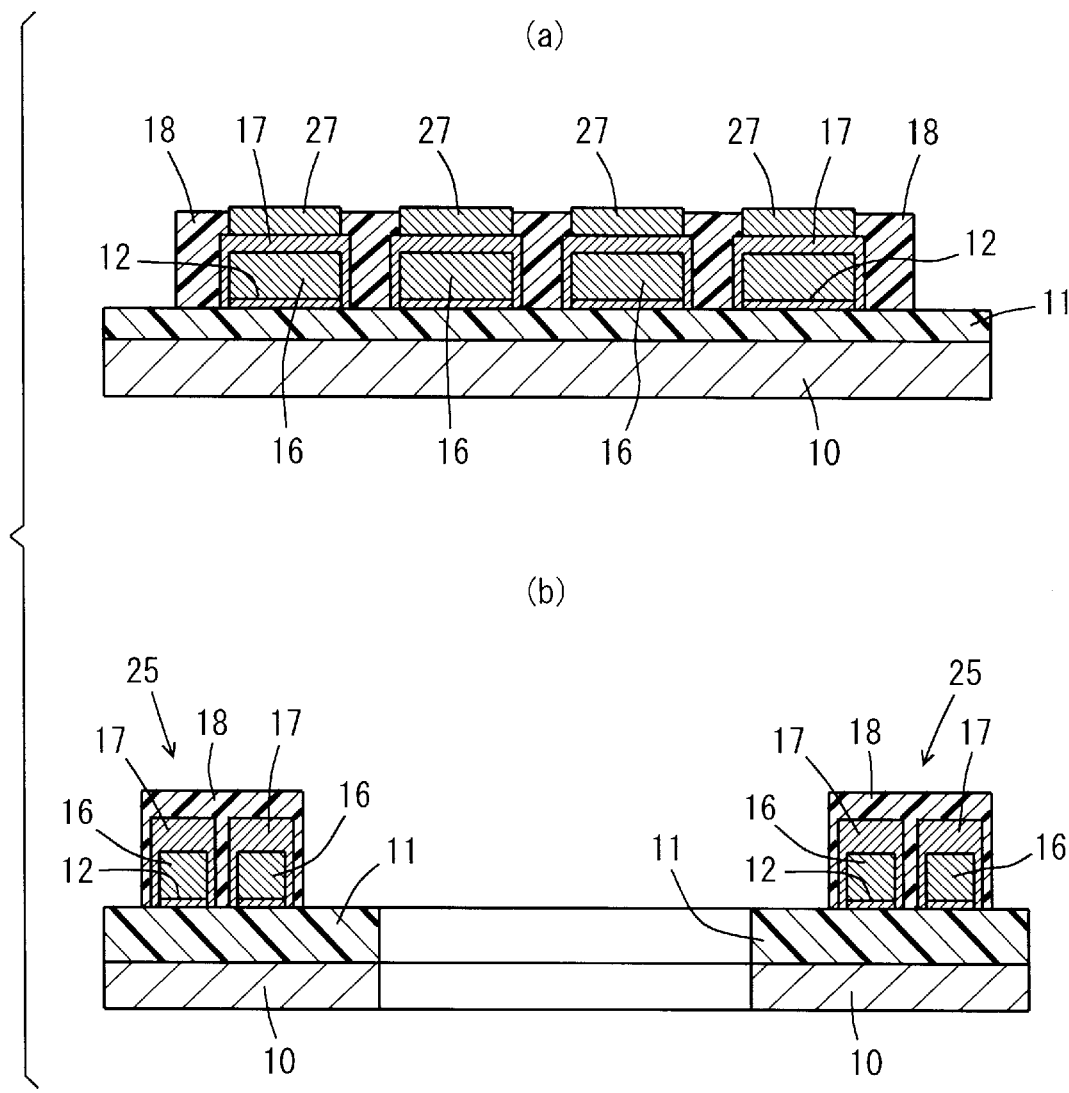
FIG. 4 shows the cross-sectional views taken along the line A—A and the line B—B of the magnetic head suspension of FIG. 3.

Next, the method for manufacturing the magnetic head suspensions will be described. FIG. 3 is a plane view showing a magnetic head suspension manufactured by the method of the embodiment of the invention. FIG. 4(a) is the sectional view taken along the line A—A of the magnetic head suspension of FIG. 3 and FIG. 4(b) is the sectional view taken along the line B—B thereof.

As shown in FIG. 3, the magnetic head suspension 1 has the body 20 formed from the long-sized substrate 10 of stainless steel. Wiring pattern 25 is formed on the body 20 of the suspension. A U-shaped opening 26 is formed near an end of the body 20 of the suspension, which forms a magnetic head supporting portion 24 (which part is called tongue hereinafter). The tongue 24 is bent along the broken line R to form a given angle with respect to the body 20 of the suspension.

Four electrode pads 22 are formed along an end of the tongue 24. Four electrode pads 27 are formed at the other end of the body 20 of the suspension. The electrode pads 22 on the tongue 24 and the electrode pads 27 at the other end of the suspension body 20 are electrically connected through the wiring pattern 25. A plurality of holes 28 are formed in the body 20 of the suspension. FIG. 3 does not show the cover layer.

As shown in FIG. 4(a), an insulating layer 11 of polyimide is formed on the substrate 10. A film of chromium 12, conductor layer pattern 16 made of copper, and film of nickel 17 are sequentially stacked in four positions on the insulating layer 11, and an electrode pad 27 of gold is formed on each part of the nickel film 17. The top surface of the insulating layer 11 is covered with a cover layer 18 of polyimide, with the top surfaces of the electrode pads 27 uncovered.

As shown in FIG. 4(b), the film of chromium 12, conductor layer pattern 16 of copper, and film of nickel 17 are sequentially laid on the insulating layer 11 in two positions on each side. The two sets of chromium film 12, conductor layer pattern 16, and nickel film 17 on each side are covered with the cover layer 18 of polyimide. The wiring pattern 25 is thus formed.

Figure 5:
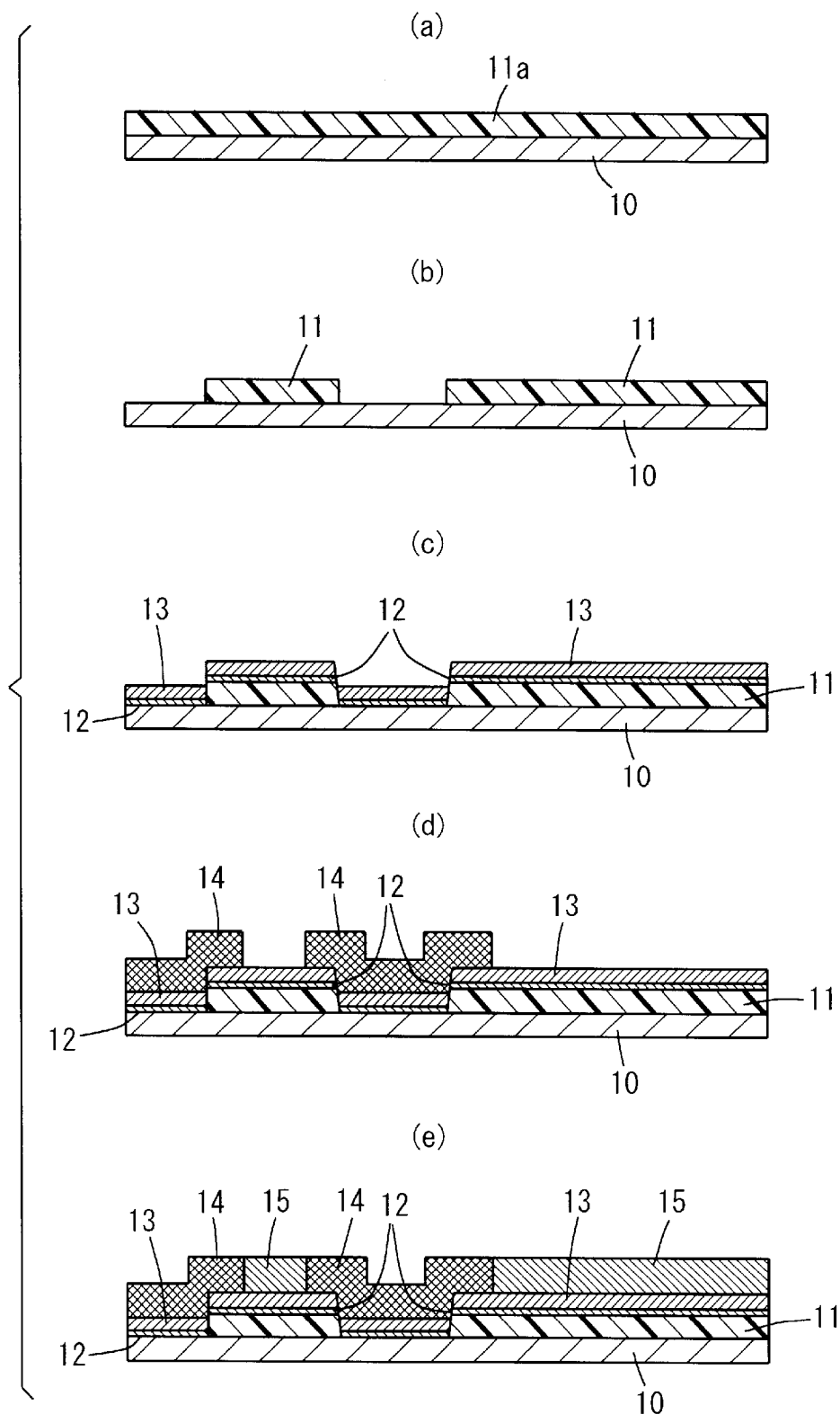
FIGS. 5 to 7 show schematic process sections showing a process of manufacturing the magnetic head suspension of FIG. 3.
Figure 6:
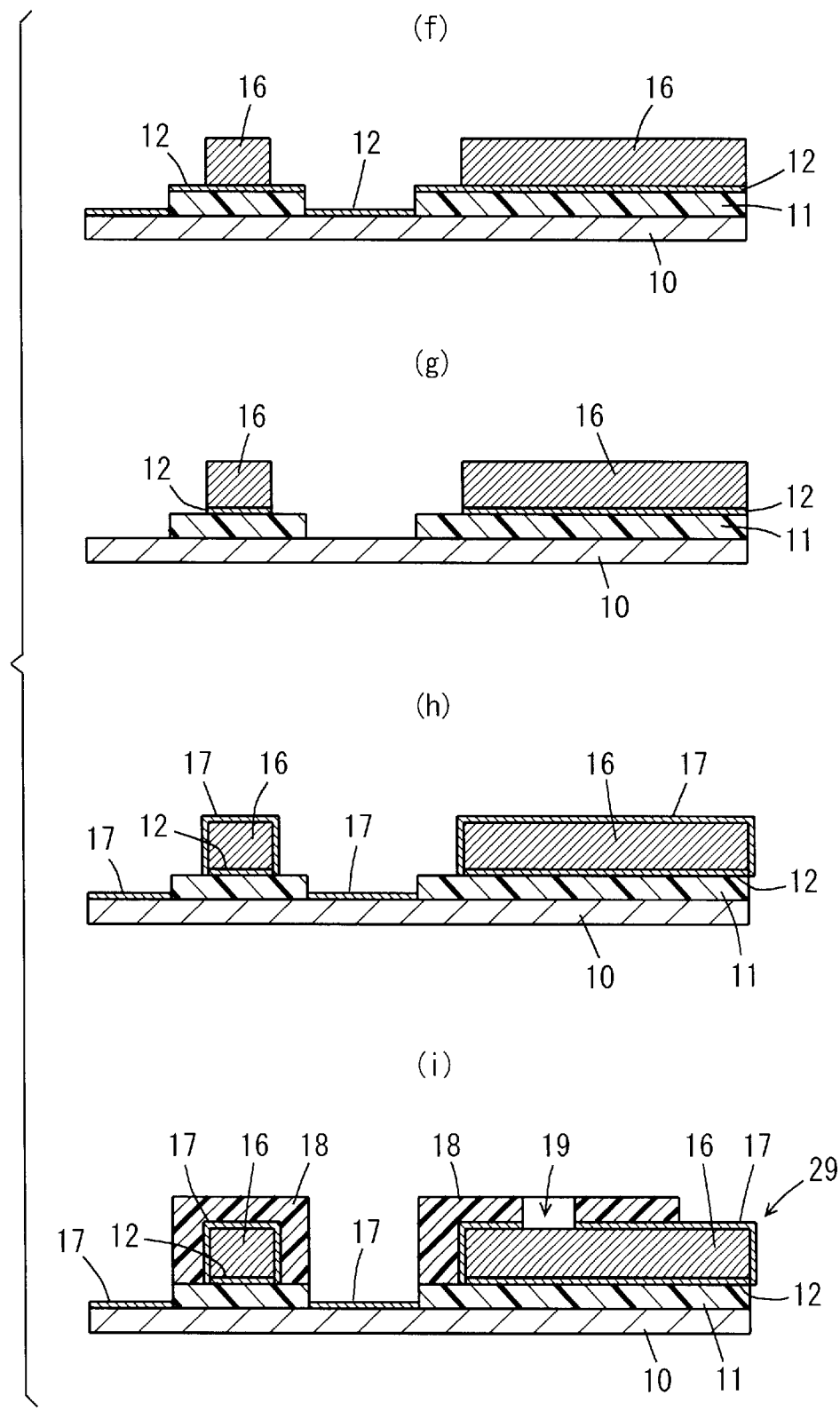
Figure 7:
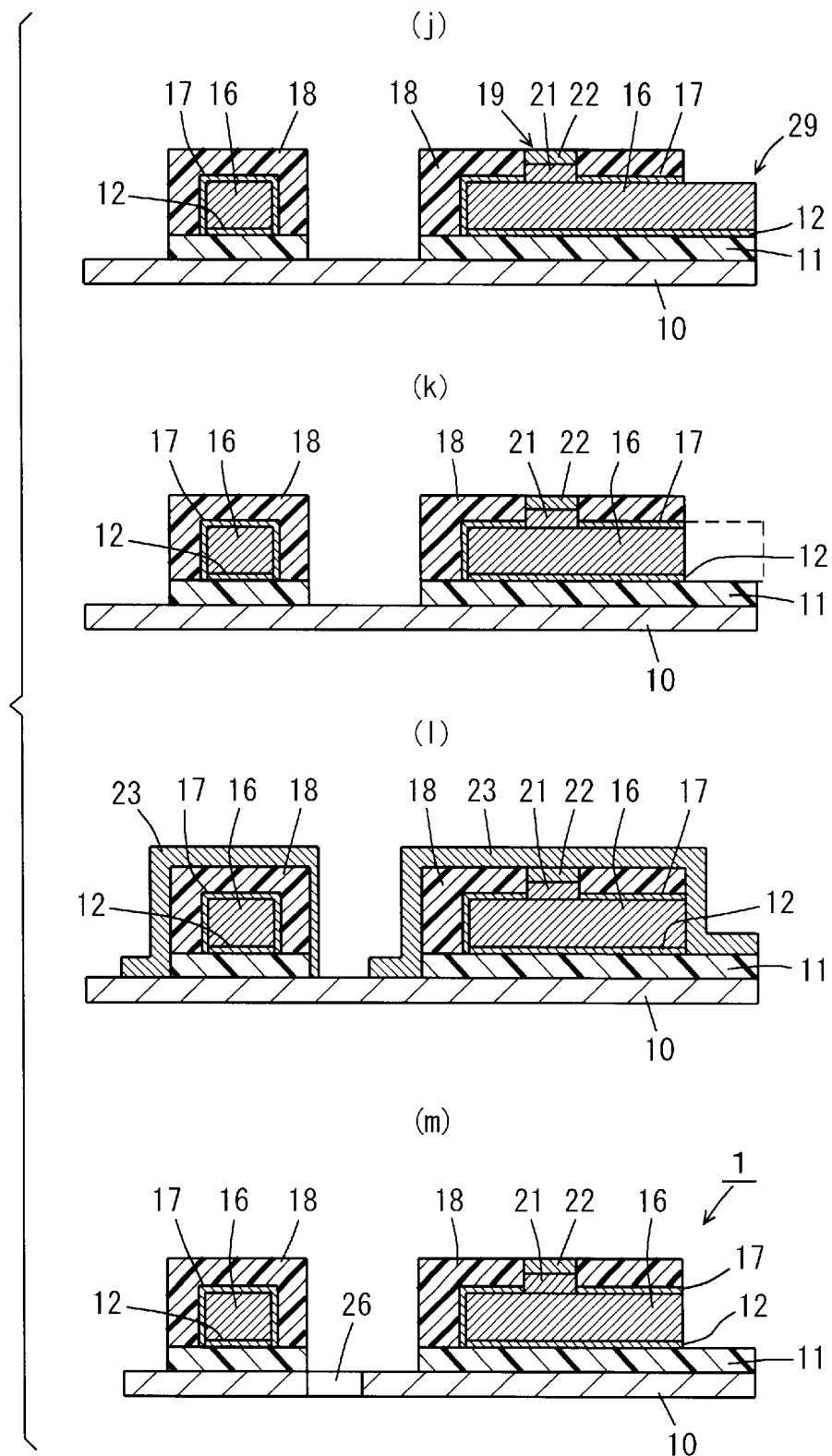

Now, a process for manufacturing the magnetic head suspension of FIG. 3 is described. FIGS. 5, 6 and 7 are schematic process sections showing the process for manufacturing the magnetic head suspension of FIG. 3.

First, as shown in FIG. 5(a), photosensitive polyimide resin precursor 11a is applied to a thickness of 5 to 25 μm on the substrate 10 made of 15- to 50-μm-thick stainless steel. Next, in an exposure device, ultraviolet radiation at 200 to 700 mJ/cm$^2$ is applied to the photosensitive polyimide resin precursor 11a on the substrate 10 through a given mask to form the polyimide insulating layer 11, as shown in FIG. 5(b).

Subsequently, as shown in FIG. 5(c), chromium and copper sputtering is continuously applied onto the substrate 10 and the insulating layer 11 to form the chromium film 12 having a thickness of 100 to 600 Å and a copper plating base 13 having a thickness of 500 to 2000 Å and a sheet resistance of 0.6 ω/□ or lower.

Next, as shown in FIG. 5(d), a given pattern of plating resist 14 is formed on the copper plating base 13. Next, as shown in FIG. 5(e), a copper plating layer 15 having a thickness of 2 to 15 μm is formed in the openings of the resist 14 through electroplating of copper. The thickness of the copper plating layer 15 is about 10 μm in this embodiment.

Next, after removal of the resist 14, the copper plating base 13 is removed by etching using an alkaline treatment solution to form the conductor layer pattern 16 of copper, as shown in FIG. 6(f). Further, as shown in FIG. 6(g), part of the chromium film 12 exposed on the substrate 10 and on the insulating layer 11 is removed by etching using an alkaline treatment solution (a solution of potassium ferricyanide).

Next, as shown in FIG. 6(h), the nickel film 17 having a thickness of 0.05 to 0.1 μm is formed on the substrate 10 and the conductor layer pattern 16 through electroless plating of nickel. This nickel film 17 is formed to enhance the adhesion between the conductor layer pattern 16 and the cover layer 18 and to prevent migration of copper.

Next, as shown in FIG. 6(i), photosensitive polyimide resin precursor is applied onto the nickel film 17 and the insulating layer 11, which is followed by exposure, heating, developing, and curing with heat, so as to form a given pattern of polyimide coating film 18 having a thickness of 3 to 5 μm on the insulating layer 11 and the nickel film 17. In this case, an opening 19 for formation of an electrode pad is formed in a given position in the cover layer 18. Part of the nickel film 17 is exposed as a lead 29 used in electroplating for formation of the electrode pad.

Next, as shown in FIG. 7(j), the exposed nickel film 17 is stripped off and electroplating is performed to form a nickel film 21 with a thickness of 1 to 5 μm and a gold electrode pad 22 with a thickness of 1 to 5 μm in the opening 19 in the cover layer 18. Subsequently, as shown in FIG. 7(k), the lead 29 for the electroplating of electrode pad is removed by etching.

Next, as shown in FIG. 7(l), a given pattern of photoresist 23 is formed on the substrate 10 and on the cover layer 18. Next, as shown in FIG. 7(m), the substrate 10 is etched by using a solution of ferric chloride and a solution of cupric chloride to form an opening 26, which is followed by removal of the photoresist 23 and, finally, by water cleaning. The magnetic head suspension 1 shown in FIG. 3 is manufactured in this way.

Figure 8:
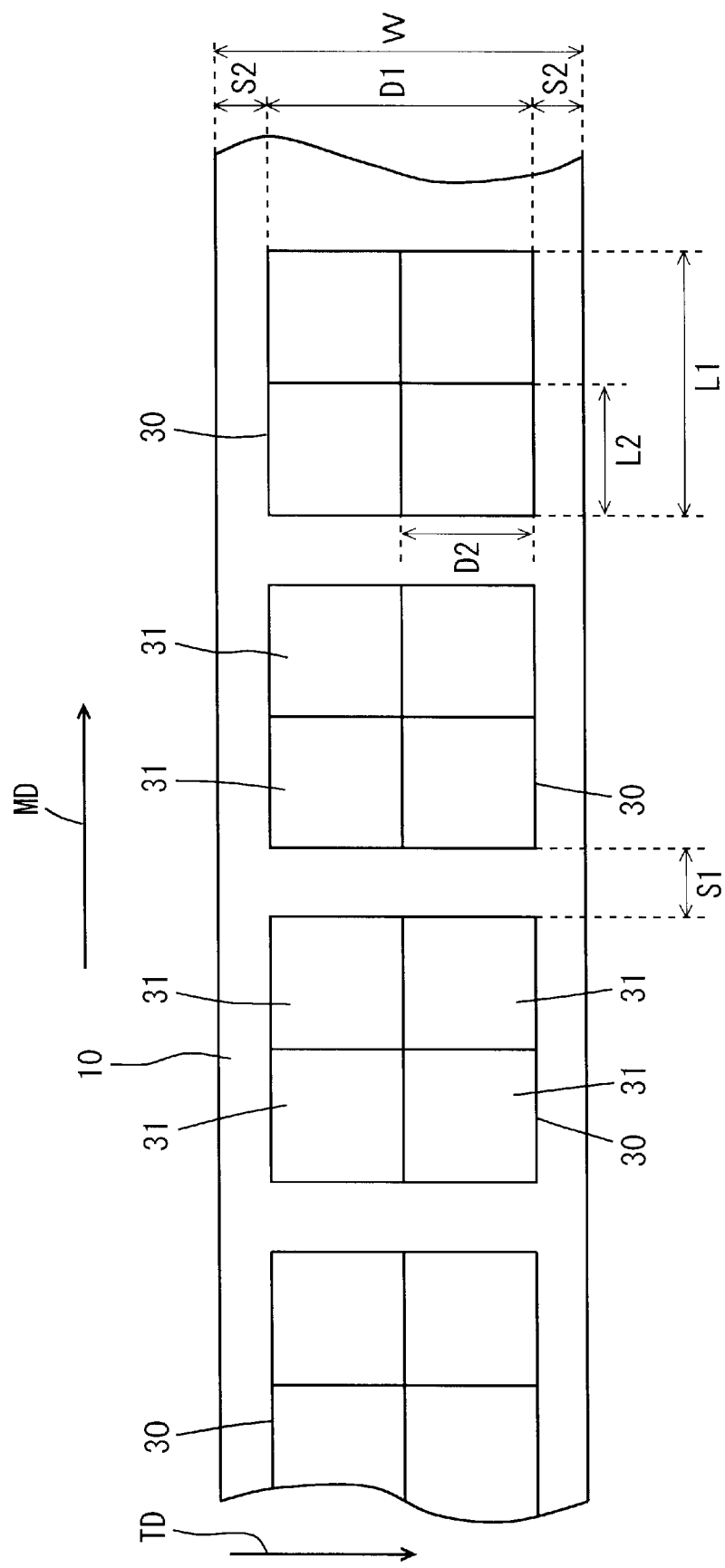
FIG. 8 is a plane view showing a long-sized substrate in the manufacturing method of the embodiment of the invention.
Figure 9:
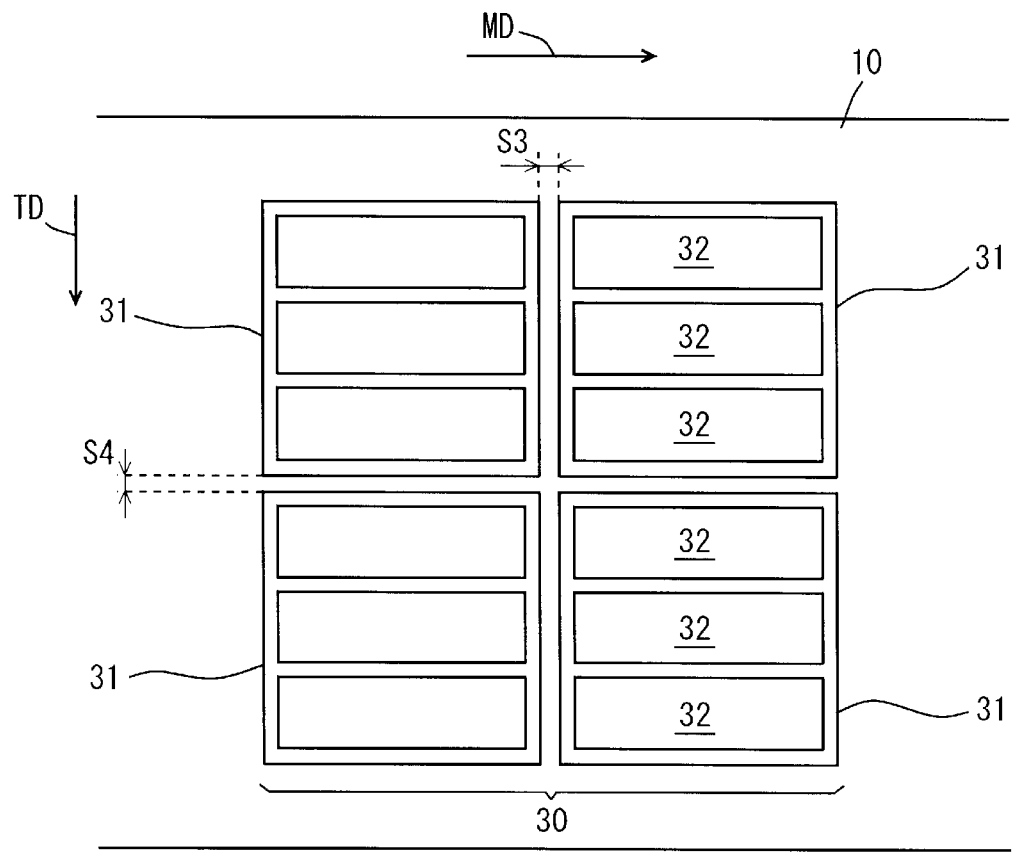
FIG. 9 is a plane view showing one region on the long-sized substrate of FIG. 8.
Figure 10:
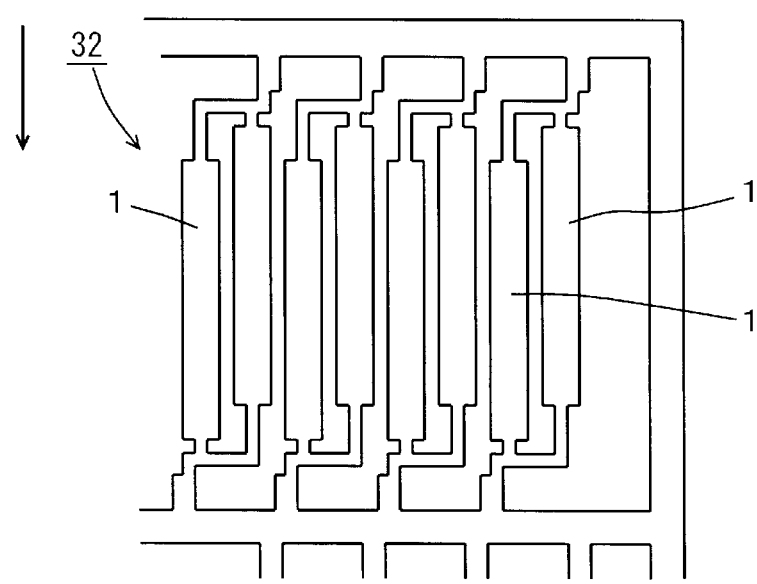
FIG. 10 is a plane view showing part of one section in the subregion of FIG. 9.

Next, a method for forming a plurality of magnetic head suspensions on a long-sized substrate is described referring to FIGS. 8, 9 and 10. FIG. 8 is a plane view of a long-sized substrate used in the manufacturing method of the embodiment of the invention, FIG. 9 is a plane view showing one region on the long-sized substrate of FIG. 8, and FIG. 10 is a plane view showing part of one section in the subregion of FIG. 9.

As shown in FIG. 8, the long-sized substrate 10 made of stainless steel is conveyed in its length direction MD. A plurality of rectangular regions 30 are formed along the length direction MD on the substrate 10. Each region 30 is sectioned into four subregions 31 arranged in two columns along the length direction MD of the substrate 10 and two rows along the width direction TD. Each subregion 31 defines a unit in exposure process performed in an exposure device and each region 30 defines a unit in batch process performed after the electrode pad plating process shown in FIG. 7(j).

The width W of the substrate 10 is 50 to 500 mm, preferably 125 to 300 mm; it is 250 mm in this embodiment. The thickness of the substrate 10 is 10 to 60 μm, preferably 10 to 30 μm to prevent vibration; it is 25 μm in this embodiment.

The area of the region 30 is 25 to 2500 cm$^2$. In this embodiment, the region 30 has a width D1 of about 200 mm and a length L1 of about 235 mm. The area of the subregion 31 corresponds to the area of the region 30 divided by the number of the subregions. While four subregions 31 are provided in this embodiment, three or two subregions 31 may be provided. It is not essential to form the subregions 31. In this embodiment, each subregion 31 has a width D2 of about 100 mm and a length L2 of about 110 mm.

Further, the intervals S1 between the regions 30 in the length direction MD are 5 to 50 mm; they are about 20 mm in this embodiment. The widths S2 outside of the regions 30 in the width direction TD are 10 to 50 mm; they are about 25 mm in this embodiment.

In each subregion 31, 2 to 200 magnetic head suspensions are arranged along the length direction MD and 1 to 30 in the width direction TD; 2 to 6000 magnetic head suspensions are thus arranged in total. The area of the subregion 31 and the number of magnetic head suspensions formed in the subregion 31 are preferably set as large as possible to obtain acceptable pieces at a higher rate.

As shown in FIG. 9, each subregion 31 is sectioned into a plurality of sections 32. In this embodiment, each subregion 31 is sectioned into three sections 32 extending along the length direction MD. In this embodiment, the interval S3 between subregions 31 adjoining in the length direction MD is 14 mm and the interval S4 between subregions 31 adjoining in the width direction TD is 4 mm.

As shown in FIG. 10, each section 32 includes a plurality of magnetic head suspensions I extended in parallel to the width direction TD. Herein, a range of a plurality of magnetic head suspensions 1 placed side by side along the length direction MD is called "a column" and a range of a plurality of magnetic head suspensions 1 lined along the width direction TD is called "a row." In this embodiment, a plurality of magnetic head suspensions 1 are arranged in 2 columns and 24 rows in each section 32. Accordingly each subregion 31 includes magnetic head suspensions 1 in 6 columns and 24 rows and each region 30 includes magnetic head suspensions 1 in 12 columns and 48 rows.

[EXAMPLES]

We measured the variations in the curvature k of test pieces 70 using three substrates 10 by the inspecting method shown in the embodiment above and manufactured a plurality of magnetic head suspensions 1 on the three substrates 10 by the manufacturing method shown in FIGS. 3 to 10; we then examined variations in warp of the tongues 24. The three substrates 10 are ref erred to as an inventive example 1, an inventive example 2, and a comparative example.

Long-sized substrates 10 made of stainless steel were used in the inventive examples 1 and 2 and the comparative example. The substrates 10 had a width W of 250 mm and a thickness of 25 μm.

First, photosensitive resist was applied to the region near the forward end of each substrate 10 and exposed and developed to form a pattern of plating resist in the areas corresponding to the ten test pieces 70 shown in FIG. 1. Next, the end region of the substrate 10 was etched with a solution of ferric chloride to extract ten test pieces 70.

Subsequently, the curvature k of each test piece 70 was obtained by the method shown in FIG. 2 using the equations (1) and (2) above and a difference between the maximum and minimum of the curvatures k of the ten test pieces 70 was obtained as the variation in the curvature k of the test pieces 70.

Next, a plurality of magnetic head suspensions 1 were manufactured on the substrates 10 of the inventive examples 1 and 2 and the comparative example by the manufacturing method shown in FIGS. 3 to 10. Each subregion 31 had a width D2 of 100 mm and a length L2 of 110 mm. The intervals S1 between regions 30 adjoining in the length direction MD were about 20 mm and the intervals S2 outside the regions 30 in the width direction TD were about 25 mm.

Each region 30 includes subregions 31 each containing the magnetic head suspensions 1 arranged in 6 columns and 24 rows. That is to say, a plurality of magnetic head suspensions 1 are arranged in 12 columns and 24 rows in two subregions 31 extending along the whole length of the width direction TD of the substrate 10.

The warps of the tongues 24 of the magnetic head suspensions 1 in 12 columns and 24 rows were measured according to the following measuring principle by using an HGA/suspension angle measuring device SAM-8000 produced by Takeshiba Denki kabushiki kaisha (Takeshiba Electric Corporation). XYZ coordinates of each tongue 24 are measured with a laser microscope at eight points including four points in the four corners of the tongue 24 and four points in the central area thereof. Next, a plane is calculated from the XYZ coordinates at the eight points by using least squares method, and the angle which the plane forms in the vertical direction with respect to the reference horizontal plane (the body 20 of the suspension) is obtained as the warp. In this case, the warp may be obtained from measurements at more than eight points.

A mean value of the warps of 24 tongues 24 arranged along the length direction MD was calculated in each column of the magnetic head suspensions 1. The mean values of the warps of the tongues 24 were thus obtained for 12 columns of the magnetic head suspensions 1 and a difference between the maximum and minimum was then obtained as the variation in the warp of the tongues 24.

Figure 11:
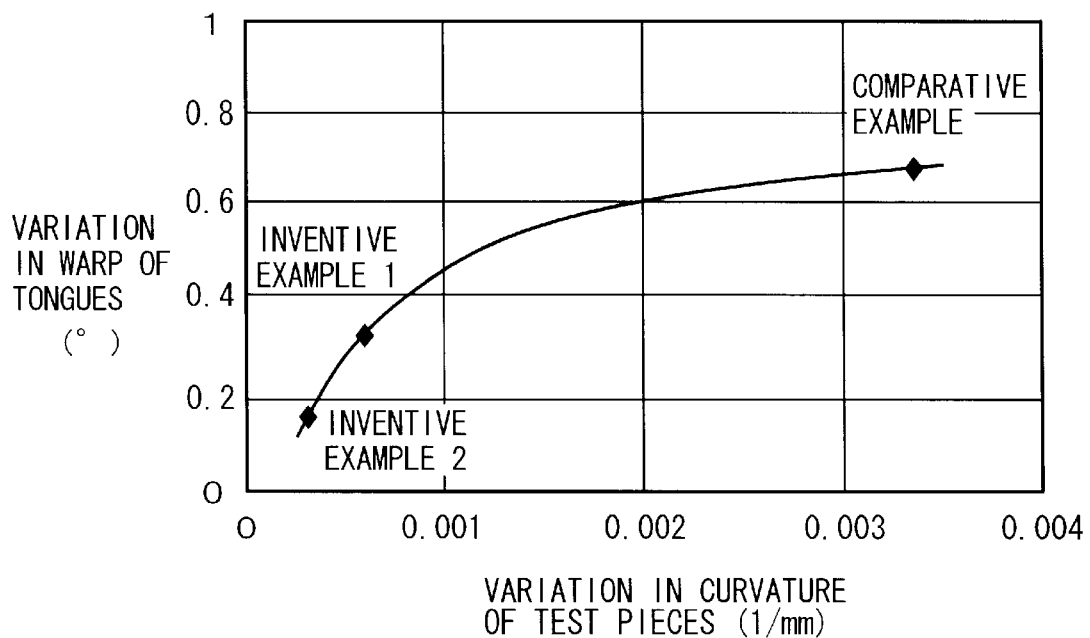
FIG. 11 is a diagram showing measurements about the relation between the variation in the curvature of test pieces and the variation in the warp of the tongues.
Figure 12:
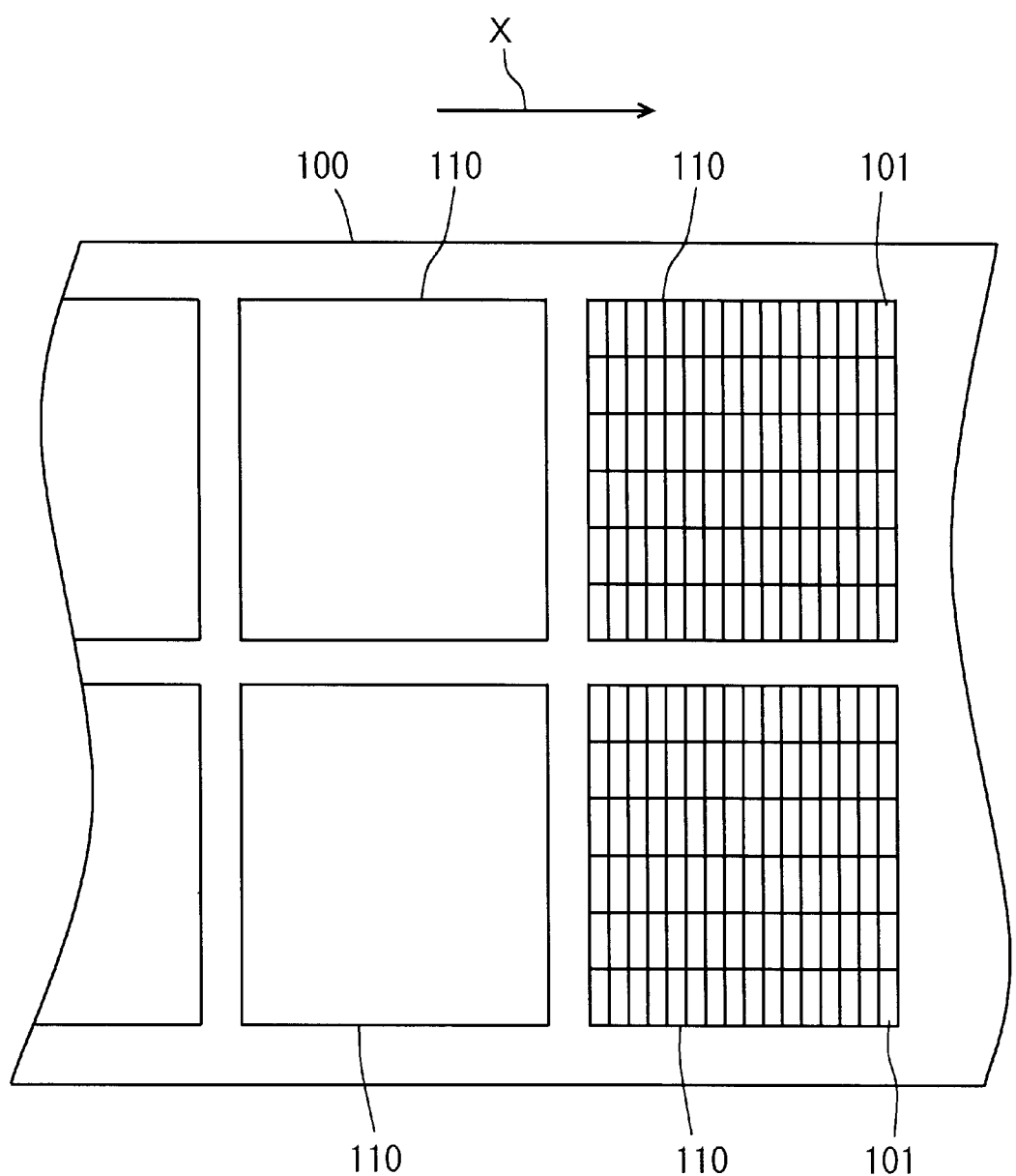
FIG. 12 is a plane view showing a long-sized substrate in a conventional manufacturing method.

Table 1 and FIG. 11 show the measurements about the relation between the variation in the curvature k of the test pieces 70 and the variation in the warp of the tongues 24 of the magnetic head suspensions 1 in the inventive examples 1 and 2 and the comparative example.

TABLE 1

|  | Variation in curvature of test pieces (l/mm) | Variation in warp of tongues (°) |
| --- | --- | --- |
| Comparative example | 0.0033 | 0.68 |
| Inventive example 1 | 0.00038 | 0.136 |
| Inventive example 2 | 0.000605 | 0.32 |

As shown in Table 1 and FIG. 11, there is a good mutual relation between the variation in the curvature k of the test pieces 70 taken from the end region of the substrate 10 and the variation in the warp of the tongues 24 of a plurality of magnetic head suspensions 1 formed on the substrate 10.

That is to say, as the variation in the curvature k of the test pieces 70 taken from the end region of the substrate 10 becomes smaller, the variation in the warp of the tongues 24 of a plurality of magnetic head suspensions 1 formed on the substrate 10 becomes smaller.

When the variation in the curvature k of the test pieces 70 is 0.002 [1/mm], the variation in the warp of the tongues 24 is about 0.60°. When the variation in the curvature k of the test pieces 70 is 0.001 [1/mm], the variation in the warp of the tongues 24 is about 0.50°.

Accordingly, it is preferable to select substrates 10 where the variation in the curvature k of the test pieces 70 is 0.002 [1/mm] or less as substrates for the magnetic head suspensions 1, and it is more preferable to select substrates 10 where the variation in the curvature k of the test pieces 70 is 0.001 [1/mm] or less as substrates for the magnetic head suspensions 1.

This reduces the variation in the warp of the tongues 24 of the magnetic head suspensions 1 and thus increases the rate of acceptable pieces. As a result, the precision in the process of bending the tongues 24 of the magnetic head suspensions 1 is improved.

While the invention has been described in detail, the foregoing description is in all aspects illustrative and not restrictive. It is understood that numerous other modifications and variations can be devised without departing from the scope of the invention.

What is claimed is:

1. A method for manufacturing magnetic head suspensions, comprising the steps of:

measuring a variation in curvature in a width direction of a long-sized metal substrate in a partial region;

selecting a metal substrate where said variation in the curvature is not more than a given value; and forming a plurality of magnetic head suspensions by sequentially forming an insulating layer and a conductor layer on said selected metal substrate while conveying said metal substrate in a length direction, wherein said step of measuring said variation in the curvature comprises the steps of:

extracting a plurality of snipe-like test pieces extended and arranged along the width direction of said partial region of said long-sized metal substrate, setting three or more measuring points on each of said extracted test pieces along their length direction, measuring heights of said three or more measuring points set on each said test piece, obtaining a curvature of each said test piece on the basis of the heights of said three or more measuring points measured for each said test piece, and calculating said variation in the curvature from the curvatures of said plurality of test pieces.

2. The magnetic head suspension manufacturing method according to claim 1, wherein said given value is $2.0 \times 10^{-3}$ mm$^{-1}$.

3. The magnetic head suspension manufacturing method according to claim 1, wherein said given value is $1.0 \times 10^{-3}$ mm$^{-1}$.

4. The magnetic head suspension manufacturing method according to claim 1, wherein said step of forming said plurality of magnetic head suspensions comprises a step of forming said plurality of magnetic head suspensions on said metal substrate in such a manner that the length direction of said plurality of magnetic head suspensions is parallel to the width direction of said metal substrate.

5. The magnetic head suspension manufacturing method according to claim 1, wherein said metal substrate is made of a stainless steel having a thickness of not less than 15 μm nor more than 50 μm.

6. The magnetic head suspension manufacturing method according to claim 1, wherein said metal substrate is made of a stainless steel having a width of not less than 100 mm nor more than 500 mm.

7. The magnetic head suspension manufacturing method according to claim 1, wherein said step of calculating said variation in the curvature comprises a step of obtaining a difference between maximum and minimum values of the curvatures of said plurality of test pieces as said variation in the curvature.

8. The magnetic head suspension manufacturing method according to claim 1, wherein said step of extracting said plurality of test pieces comprises a step of etching said partial region of said long-sized metal substrate to remove said partial region except said plurality of test pieces.

9. The magnetic head suspension manafacturing method according to claim 1, wherein said step of measuring the heights of said three or more measuring points comprises a step of measuring the heights of said three or more measuring points set on each said test piece by using a laser microscope.

10. A method for inspecting metal substrates for magnetic head suspensions, comprising the steps of:

measuring a variation in curvature in a width direction of a long-sized metal substrate in a partial region; and selecting a metal substrate where said variation in the curvature is not more than a given value as a metal substrate for the magnetic head suspensions, wherein said step of measuring said variation in the curvature comprises the steps of:
extracting a plurality of stripe-like test pieces extended and arranged along the width direction of said partial region of said long-sized metal substrate,
setting three or more measuring points on each of said extracted test pieces along their length direction,
measuring heights of said three or more measuring points set on each said test piece,
obtaining a curvature of each said test piece on the basis of the heights of said three or more measuring points measured for each said test piece, and
calculating said variation in the curvature from the curvatures of said plurality of test pieces.

11. The magnetic head suspension metal substrate inspecting method according to claim 10, wherein said given value is $2.0 \times 10^{-3}$ mm$^{-1}$.

12. The magnetic head suspension metal substrate inspecting method according to claim 10, wherein said given value is $1.0 \ 10^{-3}$ mm$^{-1}$.

13. The magnetic head suspension metal substrate inspecting method according to claim 10, wherein said metal substrate is made of a stainless steel having a thickness of not less than 15 μm nor more than 50 μm.

14. The magnetic head suspension metal substrate inspecting method according to claim 10, wherein said metal substrate is made of a stainless steel having a width of not less than 100 mm nor more than 500 mm.

15. The magnetic head suspension metal substrate inspecting method according to claim 10, wherein said step of calculating said variation in the curvature comprises a step of obtaining a difference between maximum and minimum values of the curvatures of said plurality of test pieces as said variation in the curvature.

16. The magnetic head suspension substrate inspecting method according to claim 10, wherein said step of extracting said plurality of test pieces comprises a step of etching said partial region of said long-sized metal substrate to remove said partial region except said plurality of test pieces.

17. The magnetic head suspension metal substrate inspecting method according to claim 10, wherein said step of measuring the heights of said three or more measuring points comprises a step of measuring the heights of said three or more measuring points set on each said test piece by using a laser microscope.

* * * * *